(12) United States Patent
Takahashi et al.

(10) Patent No.: US 11,805,725 B2
(45) Date of Patent: Nov. 7, 2023

(54) MOWER

(71) Applicant: HONDA MOTOR CO., LTD., Tokyo (JP)

(72) Inventors: Hiroto Takahashi, Wako (JP); Toshiaki Kawakami, Wako (JP); Taro Yokoyama, Wako (JP); Wei Song, Wako (JP); Takuya Kanisawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 357 days.

(21) Appl. No.: 17/210,564

(22) Filed: Mar. 24, 2021

(65) Prior Publication Data
US 2021/0298230 A1    Sep. 30, 2021

(30) Foreign Application Priority Data
Mar. 30, 2020 (JP) ................................. 2020-059298

(51) Int. Cl.
| *A01D 34/64* | (2006.01) |
| *A01D 34/74* | (2006.01) |
| *A01D 34/78* | (2006.01) |
| *A01D 34/00* | (2006.01) |
| *A01D 101/00* | (2006.01) |

(52) U.S. Cl.
CPC ........... *A01D 34/008* (2013.01); *A01D 34/64* (2013.01); *A01D 34/74* (2013.01); *A01D 34/78* (2013.01); *A01D 2101/00* (2013.01)

(58) Field of Classification Search
CPC ...... A01D 34/008; A01D 34/64; A01D 34/74; A01D 34/78; A01D 2101/00
USPC ...................................................... 56/10.2 A
See application file for complete search history.

(56) References Cited

U.S. PATENT DOCUMENTS

2016/0231749 A1 *   8/2016   Shimamura .......... A01D 34/008
2021/0345545 A1 *  11/2021   Zhao .................... A01D 34/008

FOREIGN PATENT DOCUMENTS

JP        2017-221116          12/2017
WO    WO-2018123631 A1 *   7/2018   ........... A01D 34/008

* cited by examiner

*Primary Examiner* — Mahmoud Gimie
(74) *Attorney, Agent, or Firm* — AMIN, TUROCY & WATSON, LLP

(57) ABSTRACT

A mower includes: a cutting part which is able to cut grass; a machine body which includes the cutting part and a cover configured to cover the cutting part from above; and a state control part which controls a state of at least one of the cutting part and the cover such that at least one of grass in a space provided between the cutting part and the cover and grass outside the cover is able to be cut in the cutting part in a case where a predetermined condition is satisfied.

12 Claims, 5 Drawing Sheets

MOWER

CROSS-REFERENCE TO RELATED APPLICATION

Priority is claimed on Japanese Patent Application No. 2020-059298, filed on Mar. 30, 2020, the contents of which are incorporated herein by reference.

BACKGROUND

Field of the Invention

The present invention relates to a mower.

Background

There are various types of mowers including a hand-push type mower in which an operator operates from behind thereof to mow grass such as turf grass and weeds, a riding type mower in which an on-board operator drives and mows grass, and a self-driving type mower which automatically travels and cuts grass without being operated by an operator (for example, refer to Japanese Unexamined Patent Application, First Publication No. 2017-221116). In these mowers, there is a clearance between a blade for mowing the grass and a housing provided at an upper portion of the mower. This clearance is a space to keep the blade out of reach even when a user accidentally puts his or her hand inside the housing.

SUMMARY

However, in conventional mowers, since such a clearance is provided, it is not possible to mow grass growing in places the blade cannot reach, such as near a wall, and thus uncut grass may remain.

An aspect of the present invention is to provide a mower capable of reducing the amount of remaining uncut grass as compared with conventional techniques.

According to an aspect of the present invention, a mower is provided including: a cutting part which is able to cut grass; a machine body which includes the cutting part and a cover configured to cover the cutting part from above; and a state control part which controls the state of at least one of the cutting part and the cover such that at least one of grass in a space provided between the cutting part and the cover and grass outside the cover is able to be cut in the cutting part in a case where a predetermined condition is satisfied.

According to such a configuration, when a predetermined condition is satisfied, the mower controls the state of at least one of the cutting part and the cover such that any one of grass in the space provided between the cutting part and the cover and grass outside the cover can be cut in the cutting part. Therefore, the mower can also mow grass in places which were difficult to mow according to the related art. Thus, it is possible to reduce the amount of remaining uncut grass as compared with conventional techniques.

The mower may further include a detection part which acquires information for detecting an obstacle, and when the obstacle is detected based on the information acquired by the detection part, the state control part may control the state of at least one of the cutting part and the cover such that grass is able to be cut in a direction in which the detected obstacle is present.

According to such a configuration, when an obstacle is detected, the state control part can move at least one of the cutting part and the cover such that grass can be cut in a direction in which the obstacle is present. Therefore, the blade of the cutting part also reaches places in which the blade of the cutting part did not reach before at least one of the cutting part and the cover is moved. Therefore, it is possible to cut grass growing in places in which the uncut grass remained according to the related art. Thus, it is possible to reduce the amount of remaining uncut grass as compared with conventional techniques.

The state control part may control the cutting part to move in the direction in which the obstacle is present or may control the cover to move in a direction opposite to the direction in which the obstacle is present.

According to such a configuration, the state control part can move the cutting part in the direction in which the obstacle is present or can move the cover in the direction opposite to the direction in which the obstacle is present. Therefore, the blade of the cutting part also reaches places in which the blade of the cutting part did not reach before at least one of the cutting part and the cover is moved. Therefore, it is possible to cut grass growing in places in which the uncut grass remained according to the related art. Thus, it is possible to reduce the amount of remaining uncut grass as compared with conventional techniques.

The state control part may control a state of at least one of the cutting part and the cover such that the grass is able to be cut in an instructed direction when a control instruction is provided from an outside.

According to such a configuration, the operator can control the state of at least one of the cutting part and the cover such that grass can be cut in a desired direction only by providing a control instruction from the outside. Thus, it is possible to reduce the amount of remaining uncut grass as compared with conventional techniques.

The state control part may control the cutting part to move in the instructed direction or may control the cover to move in a direction opposite to the instructed direction.

According to such a configuration, the state control part can move at least one of the cutting part and the cover such that grass can be cut in the direction in which the obstacle is present when a control instruction is provided from the outside. Therefore, the blade of the cutting part also reaches places in which the blade of the cutting part did not reach before at least one of the cutting part and the cover is moved. Therefore, it is possible to cut grass growing in places in which the uncut grass remained according to the related art. Thus, it is possible to reduce the amount of remaining uncut grass as compared with conventional techniques.

The detection part may be an image sensor which captures an image of a surrounding environment, and the state control part may detect the obstacle based on the image obtained by the image sensor.

According to such a configuration, the state control part can detect an obstacle more accurately using the image obtained by the image sensor.

The detection part may be a contact sensor which is able to detect the obstacle by coming into contact with the obstacle, and the state control part may detect the obstacle based on a pressure applied to the contact sensor.

According to such a configuration, the state control part can detect whether or not the mower has come into contact with an obstacle by a change in pressure. Thus, the obstacle can be detected more accurately.

The detection part may be a position information acquisition part which acquires position information, and the state control part may detect the obstacle based on the acquired position information and map data which indicates a position of an obstacle in a traveling place.

According to such a configuration, an obstacle can be detected before the mower comes into contact with the obstacle or in places in which the mower will travel. Thus, the state of the cutting part or the cover can be controlled in advance.

The state control part may output a sound or may stop control when a living being is detected in a case where the state of at least one of the cutting part and the cover is controlled such that grass outside the cover is able to be cut.

According to such a configuration, when a living being such as a human or an animal are near the mower, it is possible to alert a living being using the sound, or the control of cutting the grass outside the cover can be stopped. Thus, it is possible to alert the living being or stop the process before the mower causes harm to the living being.

An elongated hole through which a shaft part connected to the cutting part passes may be provided on the cover, and the state control part may control the height of the cutting part by moving the shaft part in response to an instruction.

According to such a configuration, the height of the cutting part can be easily changed. Therefore, it is possible to cut the grass at a desired height.

The cover may include a mechanism which prevents grass from entering an inside of the elongated hole.

According to such a configuration, it is possible to prevent grass from entering the inside of the elongate hole. Therefore, it is possible to reduce the risk of failure.

The mower may include a plurality of cutting parts, and the state control part may independently control a state of each of the plurality of cutting parts when the predetermined condition is satisfied.

According to such a configuration, even when a plurality of cutting parts are provided, each of the cutting parts can be controlled independently. Therefore, a wide range of grass can be cut.

According to the aspect of the present invention, it is possible to reduce the amount of remaining uncut grass as compared with conventional techniques.

DESCRIPTION OF EMBODIMENTS

Figure 1:
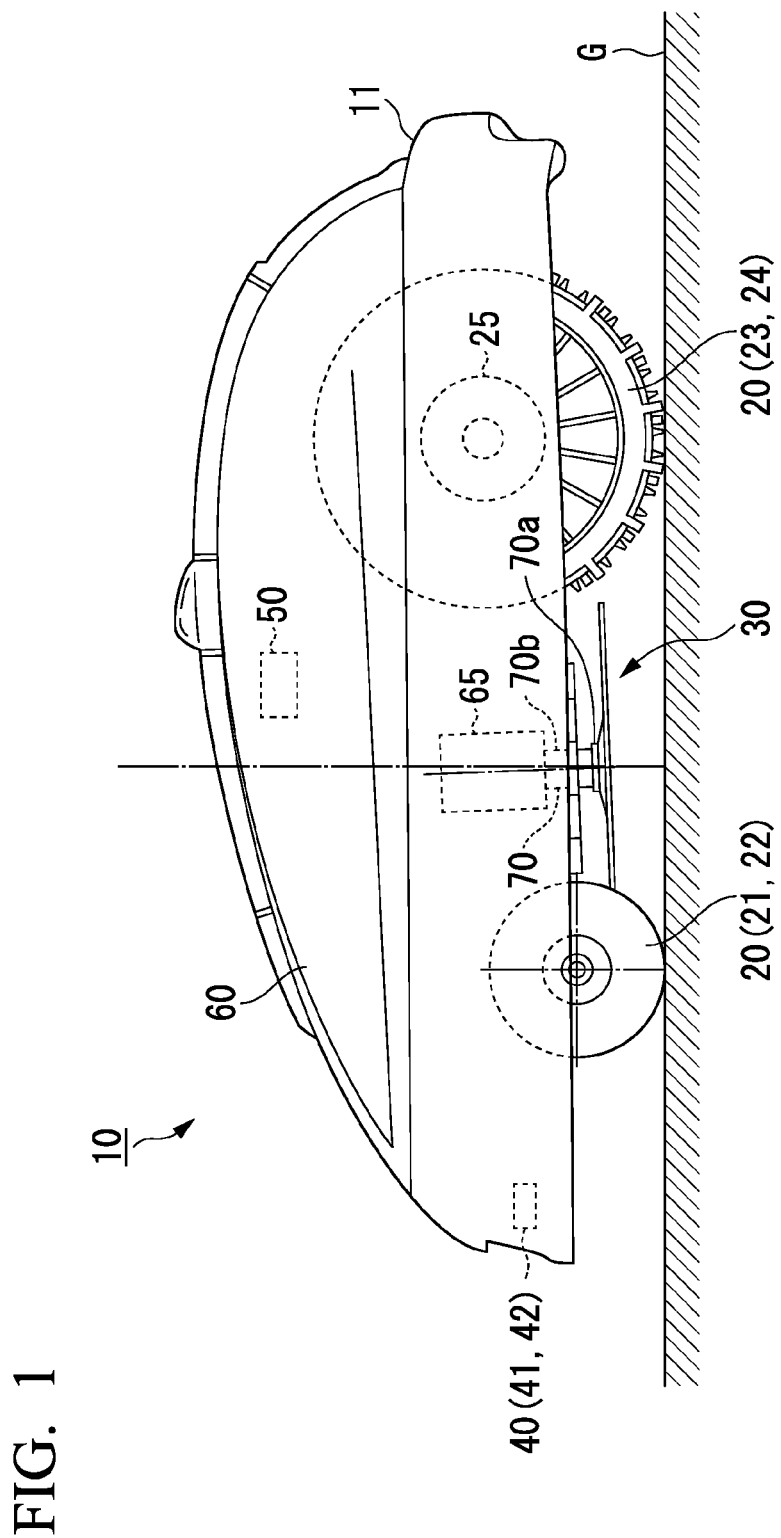
FIG. 1 is a configuration diagram of a mower according to an embodiment of the present invention.

Hereinafter, a mower according to an embodiment of the present invention will be described. In the following description, the upward, downward, left, right, forward, backward directions coincide with upward, downward, left, right, forward, backward directions in the mower. Further, in the drawing, BA indicates the backward direction, LH indicates the left-hand direction, and RH indicates the right-hand direction.

FIG. 1 is a configuration diagram of a mower 10 according to an embodiment of the present invention. The mower 10 in the embodiment of the present invention cuts grass of plants such as turf grass and weeds growing on a grass surface on the ground G. In the following description, a case in which the mower 10 cuts turf grass will be described as an example. FIG. 1 shows, as an example of the mower 10, a mower capable of automatically traveling on the ground G without being operated by an operator.

The mower 10 includes a machine body 11, a traveling wheel 20, a cutting part 30, a detection part 40, a control device 50, and a display part 60.

The machine body 11 is configured of a frame and a cover. The frame is formed of, for example, a metal member in a rectangular plate shape in a plan view. The traveling wheel 20, the cutting part 30, the control device 50, and the like which will be described later are provided in the frame. The cover is formed of, for example, a resin material in a box shape.

The cover covers the frame, the traveling wheel 20, the cutting part 30, and the control device 50 provided in the frame from above. The detection part 40 is provided on each of the left and right outer sides of the cover.

The traveling wheels 20 are provided at each of positions corresponding to four corners of the frame. The traveling wheels 20 include a right front wheel 21 and a left front wheel 22 provided on the front side of the frame, and a right rear wheel 23 and a left rear wheel 24 provided on the rear side of the frame. The right rear wheel 23 and the left rear wheel 24 are driven by a drive motor 25 provided at each of them. The drive motor 25 is an electric motor and is a power source for driving the traveling wheel 20. However, in the present embodiment, the drive motor 25 is not limited to an electric motor, and may be a prime motor driven by an engine.

The cutting part 30 is a disk-shaped member having a plurality of blades formed of a metal material on an outer edge thereof. The cutting part 30 is, what is known as, "a cutter blade". The cutting part 30 is disposed at a lower portion of the frame. The cutting part 30 can cut grass of plants such as turf grass and weeds growing on the grass surface on the ground G by rotating. For example, the cutting part 30 is supported to be able to move up and down, and can cut the grass on an edge portion of the grass surface to a desired height. The cutting part 30 is rotationally driven by a cutting part driving motor 65 provided in the frame.

The cutting part driving motor 65 is an electric motor and is a power source for driving a rotation shaft 70. However, in the present embodiment, the cutting part driving motor 65 is not limited to an electric motor, and may be a prime motor driven by an engine. The cutting part driving motor 65 has the rotation shaft 70. The rotation shaft 70 connects the cutting part driving motor 65 to the cutting part 30. For example, a first end 70a of the rotation shaft 70 is connected to a center of the cutting part 30. A second end 70b of the rotation shaft 70 is connected to an actuator (not shown) which is rotated by the cutting part driving motor 65.

The cutting part 30 is normally fixed by a fixing member (not shown) to limit the movement of the cutting part 30. Therefore, the cutting part 30 cuts the turf grass while rotating at a fixed position.

Here, "normally" is a state in which a first condition is not satisfied. The first condition is a condition for controlling a state of the cutting part 30. For example, the first condition is to detect an obstacle based on information acquired by the detection part 40. The obstacle is an object which hinders traveling of the mower 10. For example, the obstacle includes a wall, a building, a tree, and the like.

On the other hand, when the first condition is satisfied, the position of the cutting part 30 is controlled such that it is movable.

The explanation of this configuration will be described later.

The detection part 40 acquires information for detecting an obstacle. In the present embodiment, as the detection part 40, an image sensor will be described as an example. The detection part 40 (the image sensor) captures an image of the environment around the mower 10. The detection part 40 outputs the captured image to the control device 50. In the example shown in FIG. 1, the detection part 40 is configured of detection parts 41 and 42 provided on the left and right sides of the cover. For example, the detection part 41 is provided on the left side of the cover. The detection part 42 is provided on the right side of the cover.

The control device 50 controls an operation of the entire mower 10. A specific description of the control device 50 will be described later.

The display part 60 is an image display device such as a liquid crystal display or an organic electro luminescence (EL) display. The display part 60 displays a variety of information. The display part 60 displays, for example, information on the state, maintenance, or management of the mower 10. The display part 60 may be a touch panel. In this case, the display part 60 is configured so that an instruction from a user can be input to the mower 10. The instruction from the user is, for example, an instruction such as starting or ending driving of the mower 10.

Figure 2:
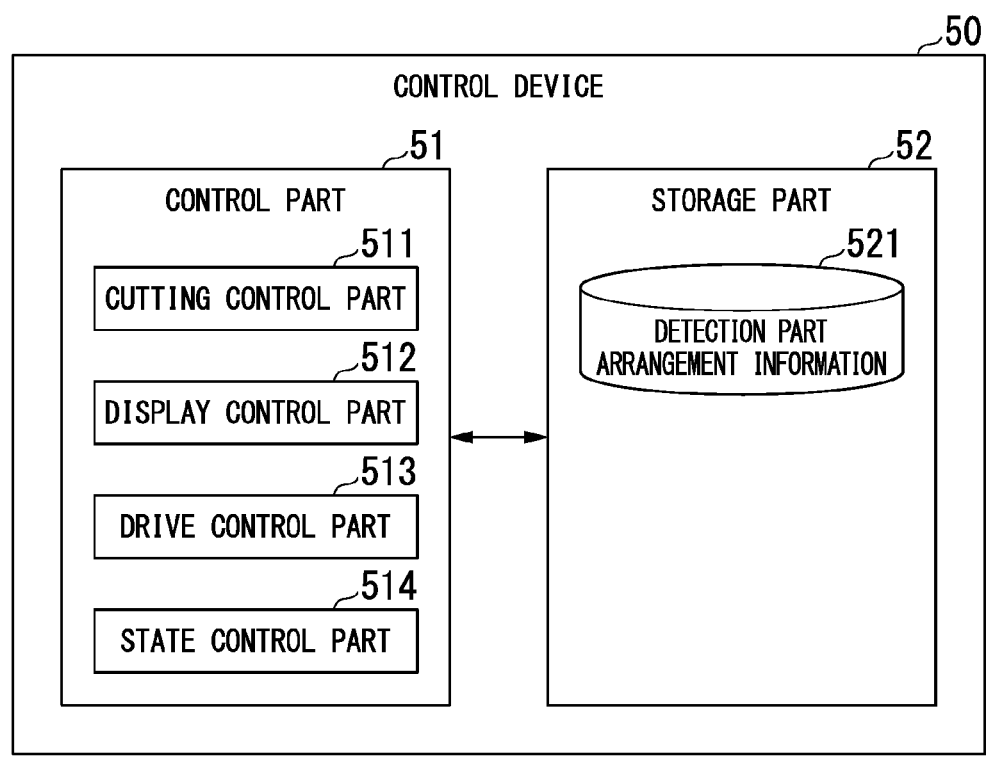
FIG. 2 is a schematic block diagram showing a functional configuration of a control device according to the embodiment.

FIG. 2 is a schematic block diagram showing a functional configuration of the control device 50 according to the embodiment.

The control device 50 includes a control part 51 and a storage part 52.

The control part 51 is configured using a processor such as a central processing unit (CPU) or a memory. The control part 51 realizes functions of a cutting control part 511, a display control part 512, a drive control part 513, and a state control part 514 by executing a program. Some of the functions need not be installed in the control device 50 in advance, and may be realized by installing an additional application program in the control device 50.

The cutting control part 511 controls rotation of the cutting part 30 according to an instruction from the outside. For example, the cutting control part 511 rotates the cutting part 30 by driving the cutting part driving motor 65 when an instruction to start operation is provided from the outside. Further, the cutting control part 511 stops the rotation of the cutting part 30 by stopping the driving of the cutting part driving motor 65 when an instruction to end operation is provided from the outside. The instructions from the outside may be wirelessly input to the mower 10 from the outside.

The display control part 512 controls display of the display part 60. For example, the display control part 512 causes the display part 60 to display information on the state, maintenance, or management of the mower 10.

The drive control part 513 controls rotation of the traveling wheel 20 according to an instruction from the outside. For example, the drive control part 513 rotates the right rear wheel 23 and the left rear wheel 24 by driving the drive motor 25 when an instruction to start traveling is provided from the outside. Specifically, the drive control part 513 advances the mower 10 by rotating the left and right drive motors 25 in the forward direction at a constant speed. The drive control part 513 retracts the mower 10 by rotating the left and right drive motors 25 in the backward direction at a constant speed. Further, the drive control part 513 turns the mower 10 by driving one of the left and right drive motors 25. Further, the drive control part 513 stops the traveling of the mower 10 by stopping the driving of the drive motor 25 when an instruction to end traveling is provided from the outside.

When the first condition is satisfied, the state control part 514 controls the state of the cutting part 30 so that turf grass in a space provided between the cutting part 30 and the cover can be cut in the cutting part 30. The state control part 514 controls the state of the cutting part 30 when the first condition is satisfied, that is, when an obstacle is detected based on the information acquired by the detection part 40. For example, the state control part 514 controls the state of the cutting part 30 so that turf grass can be cut in a direction in which the obstacle is present.

More specifically, the state control part 514 moves the cutting part 30 in the direction in which the obstacle is present. Thus, it is possible to cut turf grass growing in places in which the cutting part 30 cannot reach before it is controlled. Hereinafter, a process of controlling the state by the state control part 514 is referred to as a state control process.

The storage part 52 stores detection part arrangement information 521. The detection part arrangement information 521 is information on an arrangement position of the detection part 40. For example, the detection part arrangement information 521 includes information indicating whether each of the detection parts 41 and 42 is disposed on the left or right side of the mower 10. The storage part 52 is configured using a storage device such as a magnetic hard disk device or a semiconductor storage device.

Figure 3:
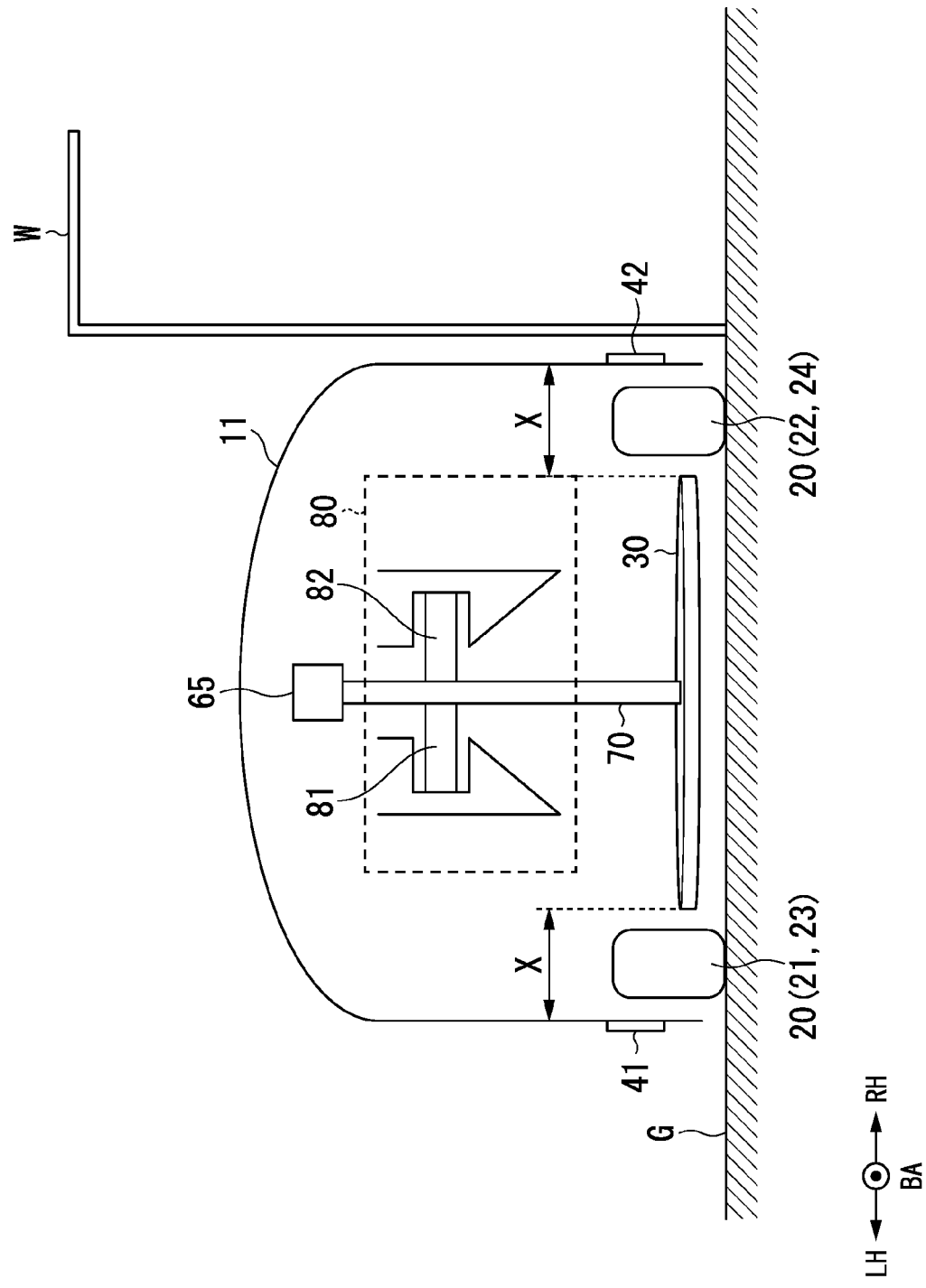
FIG. 3 is a diagram for explaining a fixed state of a cutting part of the mower in the embodiment.

FIG. 3 is a diagram for explaining a fixed state of the cutting part 30 of the mower 10 in the embodiment.

FIG. 3 shows a state in which the mower 10 is seen from the rear. The mower includes a fixing part 80 as shown in FIG. 3 between the cutting part 30 and the cutting part driving motor 65. The fixing part 80 is a functional part for fixing to restrict a movement of the position of the cutting part 30. The fixing part 80 includes at least fixing members 81 and 82. The fixing members 81 and 82 do not necessarily have to be in contact with the rotation shaft 70 not to hinder the rotation of the rotation shaft 70. In such a configuration, the movement of the position of the cutting part 30 is restricted. Further, as shown in FIG. 3, a space of a predetermined distance x is provided between the cover of the machine body 11 and the cutting part 30. This space is called a clearance and is for keeping the blade of the cutting part 30 out of reach even when a person accidentally puts his/her hand inside the cover.

Figure 4:
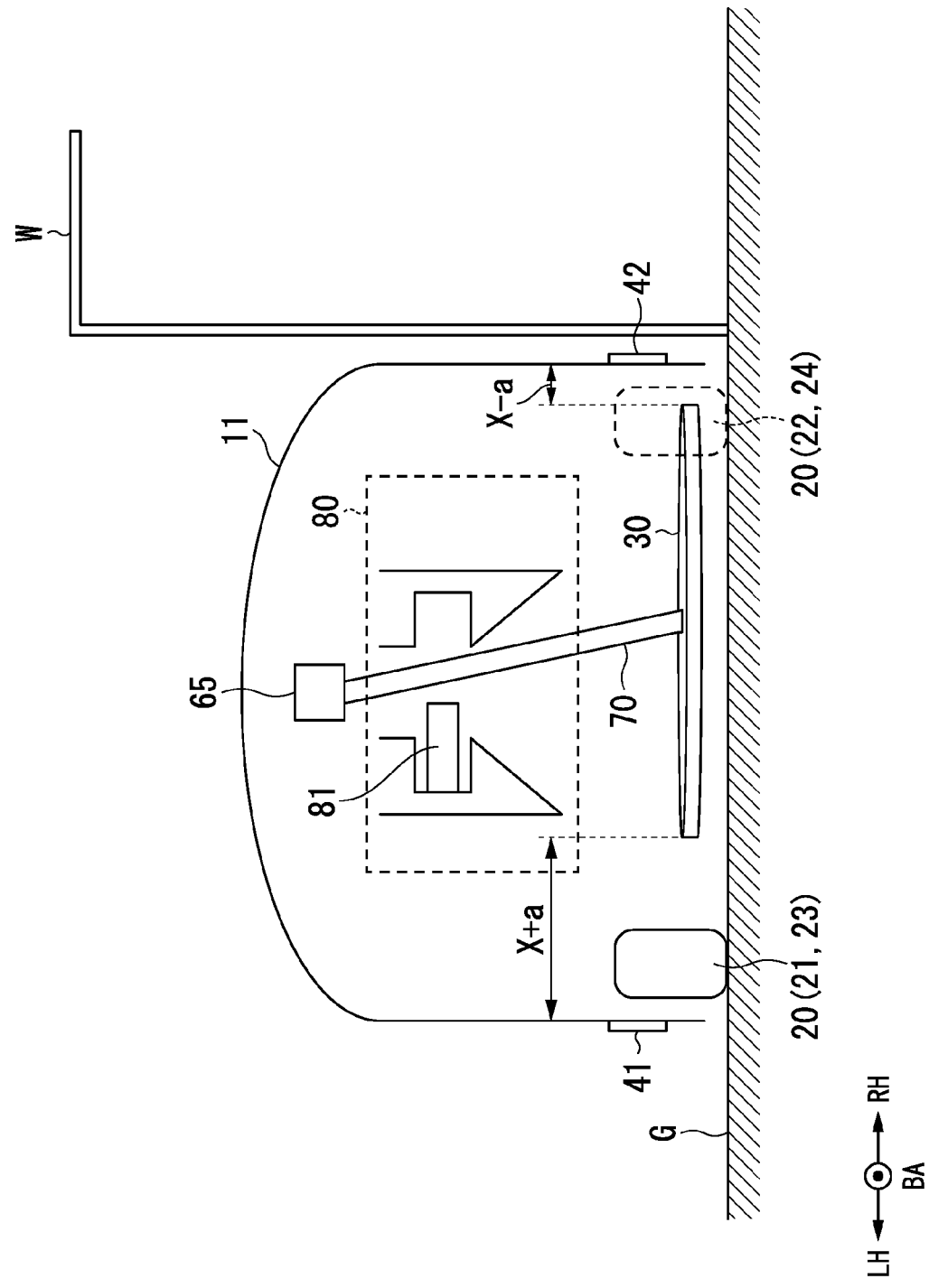
FIG. 4 is a diagram for explaining a state in which a state of the cutting part of the mower in the embodiment is controlled.

Conventionally, when the mower 10 is located near a wall W, it is not possible to mow turf grass in a space of this distance x cm (x is a predetermined value). That is, uncut grass remains. On the other hand, in the embodiment of the present invention, when an obstacle is detected based on the information acquired by the detection part 40, the state of the cutting part 30 is controlled so that the turf grass in the space provided between the cutting part 30 and the cover can be cut in the cutting part 30. In the example shown in FIG. 3, it is assumed that an obstacle is detected based on the information obtained by the detection part 42. In this case, as shown in FIG. 4, the state control part 514 controls the cutting part 30 in a movable state by moving the fixing member 82. FIG. 4 is a diagram for explaining a state in which the state of the cutting part 30 of the mower 10 in the embodiment is controlled.

As shown in FIG. 4, the cutting part 30 can be controlled to the right by moving the fixing member 82. Therefore, the state control part 514 moves the position of the cutting part 30 to the vicinity of the position of the cover by controlling an actuator (not shown). This movement amount may be set in advance. For example, as shown in FIG. 3, when the distance between the cover of the machine body 11 and the cutting part 30 is determined to be x cm, the movement amount may be set so that the blade of the cutting part 30 does not come into contact with the cover. FIG. 4 shows an example in which the state control part 514 moves the cutting part 30 in a direction of the wall W (the obstacle) by (x-a) cm (a is a predetermined value). In such a configuration, it is possible to mow (x-a) cm of a region in which x cm of uncut grass remained in the past.

FIG. 4 shows a configuration in which the cutting part 30 is moved to the right, but when an obstacle is detected based on the information obtained by the detection part 41, the state control part 514 controls the cutting part 30 to move to the left.

Figure 5:
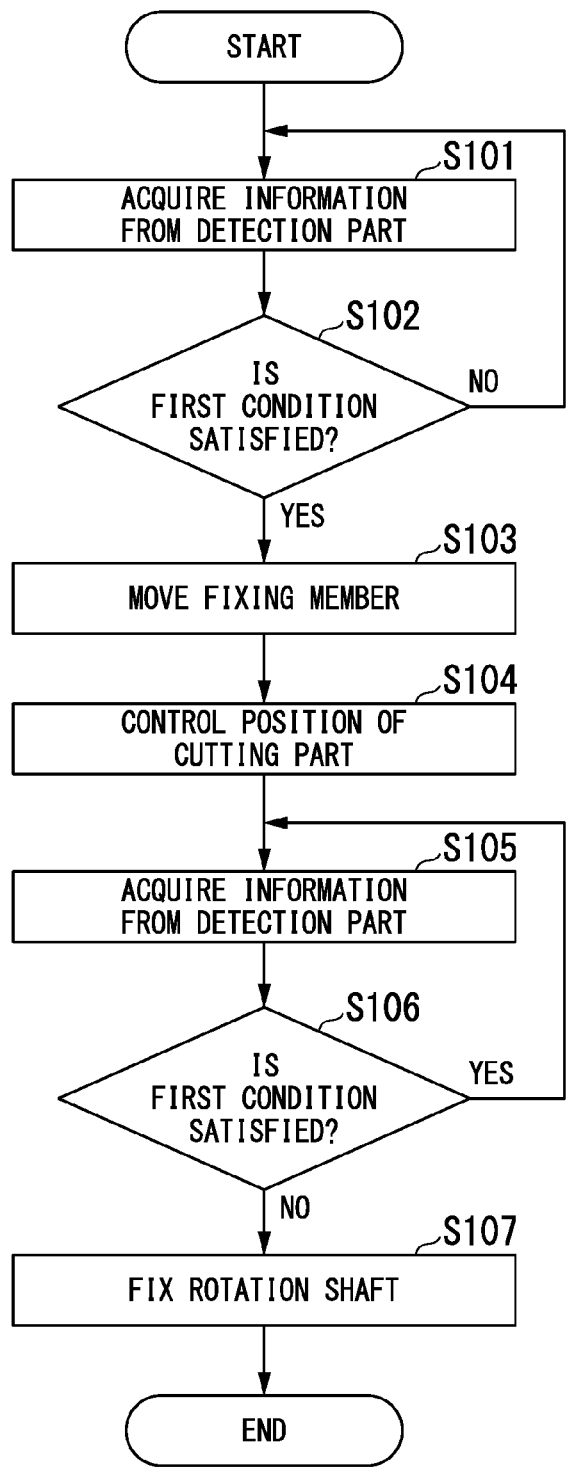
FIG. 5 is a flowchart showing a flow of a state control process of the mower in the embodiment.

FIG. 5 is a flowchart showing a flow of the state control process of the mower in the embodiment. The process of FIG. 5 is performed while the mower 10 is traveling.

In Step S101, the state control part 514 acquires the information output from the detection part 40. For example, the state control part 514 acquires image data output from the detection part 40. Since the detection part 40 is mounted on the left and right sides of the cover of the mower 10, the state control part 514 acquires information from each of the detection parts 41 and 42.

In Step S102, the state control part 514 determines whether or not the first condition is satisfied based on the acquired image data. Specifically, the state control part 514 determines that the first condition is satisfied when an obstacle is captured in the obtained image data. On the other hand, the state control part 514 determines that the first condition is not satisfied when no obstacle is captured in all the obtained image data.

Whether or not an obstacle is captured in the image data may be determined by image matching or may be determined using a trained model. When it is determined by the image matching, the state control part 514 calculates a degree of similarity between reference image data in which an obstacle is captured and the obtained image data. There may be a plurality of pieces of reference image data. In this case, the state control part 514 calculates the degree of similarity between each of the plurality of pieces of reference image data in which an obstacle is captured and the obtained image data. When the calculated degree of similarity is equal to or more than a threshold value, the state control part 514 determines that an obstacle is captured in the obtained image data. On the other hand, when the calculated degree of similarity is less than the threshold value, the state control part 514 determines that no obstacle is captured in the obtained image data.

The state control part 514 performs the following process when a determination is made based on the trained model. Here, the trained model is a model trained to output the presence or absence of the obstacle as output data using the obtained image data as input data. It is assumed that the trained model is generated in advance by learning and stored in the storage part 52. The state control part 514 inputs the obtained image data to the trained model, and when the output result shows that there is an obstacle, the state control part 514 determines that an obstacle is captured in the obtained image data. On the other hand, when the output result shows that there is no obstacle, the state control part 514 determines that no obstacle is captured in the obtained image data.

The state control part 514 determines whether or not an obstacle is captured in the obtained image data by any one of the above-described methods. When a structure is captured in at least one of the obtained image data, the state control part 514 determines that the first condition is satisfied. When the structure is not captured in any of the obtained image data, the state control part 514 determines that the first condition is not satisfied. When the first condition is not satisfied (Step S102-NO), the process of Step S101 is repeatedly performed until the first condition is satisfied. When the first condition is satisfied (Step S102—YES), the state control part 514 performs the process of Step S103.

In Step S103, the state control part 514 moves any one of the fixing members 81 and 82 in the fixing part 80. Specifically, the state control part 514 identifies the arrangement position of the detection part 40 (41 or 42) which has acquired the image data satisfying the first condition with reference to the detection part arrangement information 521 stored in the storage part 52. After that, the state control part 514 moves the fixing member in the direction corresponding to the arrangement position of the identified detection part 40. Thus, the cutting part 30 can be moved in a direction of the detection part 40 (41 or 42) which has acquired the image data satisfying the first condition. For example, when the detection part 40 which has acquired the image data satisfying the first condition is the detection part 41, the cutting part 30 can be moved in a direction in which the detection part 41 is disposed (for example, to the left). The state control part 514 may move both the fixing members 81 and 82 regardless of the arrangement position of the detection part 40 (41 or 42) which has acquired the image data satisfying the first condition.

In Step S104, the state control part 514 controls the position of the cutting part 30. Specifically, the state control part 514 controls the actuator to move the position of the cutting part 30 such that the cutting part 30 approaches in a direction of the detection part 40 (41 or 42) that has acquired the image data satisfying the first condition.

In Step S105, the state control part 514 acquires the information output from the detection part 40. For example, the state control part 514 acquires the image data output from the detection part 40. Since the detection part 40 is installed on each of the left and right sides of the cover of the mower 10, the state control part 514 acquires information from each of the detection parts 41 and 42.

In Step S106, the state control part 514 determines whether or not the first condition is satisfied based on the acquired image data. When the first condition is satisfied (Step S106—YES), the process of Step S105 is repeatedly performed until the first condition is not satisfied. When the first condition is not satisfied (Step S106-NO), it is assumed that there is no obstacle around the mower 10. Therefore, the state control part 514 performs a process of Step S107.

In Step S107, the state control part 514 fixes the rotation shaft 70. Specifically, first, the state control part 514 controls the actuator to move the position of the cutting part 30 to a position before control. Next, the state control part 514 fixes the rotation shaft 70 by returning the moved fixing member 81 or 82 to a position before the movement.

According to the mower 10 configured as described above, it is possible to reduce the amount of remaining uncut grass as compared with conventional techniques. The mower 10 includes the cutting part 30 capable of cutting turf grass, the machine body 11 having the cutting part 30 and the cover which covers the cutting part 30 from above, and the state control part 514 which controls the state of the cutting part 30 so that turf grass in the space provided between the cutting part 30 and the cover can be cut in the cutting part 30 when the first condition is satisfied.

According to such a configuration, when the first condition is satisfied, since the state of the cutting part 30 is controlled so that turf grass in the space provided between the cutting part 30 and the cover can be cut in the cutting part 30, the mower 10 can also mow turf grass in places in which the turf grass could not be mown in the past. Therefore, it is possible to reduce the amount of remaining uncut grass as compared with conventional techniques.

MODIFIED EXAMPLE

The above-described embodiment has described the configuration in which, when the first condition is satisfied, the state control part 514 controls the state of the cutting part 30 so that turf grass in the space provided between the cutting part 30 and the cover can be cut in the cutting part 30. On the other hand, the state control part 514 may be configured to control the state of the cover so that turf grass in the space provided between the cutting part 30 and the cover can be cut in the cutting part 30 when a second condition is satisfied. The second condition is a condition for controlling the state of the cover. For example, the second condition is to detect an obstacle based on the information acquired by the detection part 40. The state control part 514 controls the state of the cover when the second condition is satisfied, that is, when an obstacle is detected based on the information acquired by the detection part 40. For example, the state control part 514 controls the state of the cover so that turf grass can be cut in the direction in which the obstacle is present. More specifically, the state control part 514 moves the cover in a direction opposite to the direction in which the obstacle is present. Thus, it is also possible to cut turf grass which grows out of reach before the cover is controlled.

In the above-described embodiment, the cutting part 30 which is the cutter blade having a plurality of blades formed of a metal material on the outer edge has been described as an example, but the aspect of the cutting part 30 is not limited to this aspect. For example, the cutting part 30 may be a nylon cord cutter in which a plurality of string-shaped nylon cords are mounted on an outer edge of a disk-shaped member.

According to such a configuration, even when the cutting part 30 comes into contact with a structure, concrete, tile, fence, or the like, damage to the cutting part 30 can be curbed.

In the above-described embodiment, although the example in which the detection part 40 is configured of the detection parts 41 and 42 provided on the left and right sides of the cover has been described, the image sensor as the detection part 40 may be a compound eye camera or a 360° camera. When the detection part 40 is a compound eye camera, it may be mounted on the front side of the cover and face forward in a traveling direction. When the detection part 40 is a 360° camera, one 360° camera may be mounted on a top portion of the mower 10.

In the above-described embodiment, the detection part 40 has been described as an image sensor, but the detection part 40 is not limited thereto. For example, the detection part 40 may be any one of a contact sensor, an optical sensor, and a position information acquisition part, or may be a combination thereof.

A configuration of the mower 10 in which the detection part 40 is a contact sensor will be described. The contact sensor detects a difference in a pressure applied to the contact sensor when the mower 10 comes into contact with an obstacle. The contact sensor includes, for example, a piezo element, and detects a difference in a pressure due to a change in electrical resistance according to an external pressure. The contact sensor outputs a detected pressure value to the state control part 514. The state control part 514 detects an obstacle based on the pressure value output from the contact sensor, that is, the pressurization on the contact sensor. For example, when the pressure value output from the contact sensor is equal to or more than a threshold value, the state control part 514 determines that the mower 10 has come into contact with an obstacle. Then, the state control part 514 controls the state of at least one of the cutting part 30 and the cover so that turf grass can be cut in a direction in which the mower has come into contact with an obstacle.

A configuration of the mower 10 in which the detection part 40 is a position information acquisition part will be described. The position information acquisition part acquires position information of the mower 10. In this case, the state control part 514 may be configured to detect an obstacle based on the acquired position information and map data. In such a configuration, the position information acquisition part acquires the position information of the mower 10 by a global positioning system (GPS). The position information acquisition part outputs the acquired position information to the state control part 514. The position information acquisition part acquires the position information according to a predetermined timing or an instruction from the state control part 514. The map data is data showing the position of the obstacle in places in which the mower 10 is traveling. The map data may be stored in the storage part 52 or may be received from the outside. The state control part 514 detects an obstacle when a distance between the position of the mower 10 and the obstacle indicated on the map data is less than a predetermined distance based on the position information and the map data. In this case, the state control part 514 controls the state of at least one of the cutting part and the cover so that turf grass can be cut in the direction in which the detected obstacle is present.

It is also assumed that the detection part 40 is the position information acquisition part and the mower 10 does not hold the map data. Generally, it is considered that accuracy of the position information is lower when there is an obstacle around the mower 10 than when there is no obstacle around the mower 10. In this case, the state control part 514 may be configured to detect an obstacle based on a plurality of pieces of position information obtained by the position information acquisition part. In such a configuration, the state control part 514 obtains a variation in the plurality of pieces of position information. The state control part 514 determines that the accuracy of the position information has deteriorated when the variation of the obtained position information is equal to or more than a threshold value. In this case, the state control part 514 detects that there is an obstacle somewhere around the mower 10.

The above-described embodiment has described the configuration of the mower in which turf grass in the space provided between the cutting part 30 and the cover can be cut in the cutting part 30 when the first condition is satisfied. On the other hand, the mower 10 may be configured to control the state of the cutting part 30 so that turf grass outside the cover can be cut when the first condition is satisfied. In such a configuration, the state control part 514 moves the cutting part 30 so that at least a part of the cutting part 30 comes out of the cover. When even a part of the cutting part 30 comes out of the cover, a safety problem arises. Therefore, such a configuration can be preferably used when the cutting part 30 is a nylon cord cutter.

According to such a configuration, the turf grass outside the cover can be cut.

The above-described example has described the configuration of the mower 10 in which turf grass in the space provided between the cutting part 30 and the cover can be cut in the cutting part 30 when the second condition is satisfied. On the other hand, the mower 10 may be configured to control the state of the cover so that turf grass outside the cover can be cut when the second condition is satisfied. In such a configuration, the state control part 514 moves the cover so that at least a part of the cutting part 30 comes out of the cover. When even part of the cutting part 30 comes out of the cover, a safety problem arises. Therefore, such a configuration can be preferably used when the cutting part 30 is a nylon cord cutter.

According to such a configuration, the turf grass outside the cover can be cut.

As described above, when even a part of the cutting part 30 comes out of the cover, a safety problem arises. It is considered that this problem will be remarkable when a living being such as a person or an animal is located near the mower 10. Therefore, the state control part 514 may be configured to output a sound or to stop the control when a living being is detected even though any one of the first condition and the second condition is satisfied. In such a configuration, the mower 10 further includes a sensor for detecting a living being as the detection part 40. The sensor for detecting a living being may be a human detection sensor or an image sensor. The sensor for detecting a living being is mounted on the front side of the mower 10, for example. When a living being is detected based on the information obtained by the sensor for detecting the living being from immediately after any one of the first condition and the second condition is satisfied until the state control ends, the state control part 514 outputs a sound or stops the control. Stopping the control referred to here means stopping the control of the state of the cutting part 30 or the cover and returning to the state before the state of the cutting part 30 or the cover is controlled (returning to the fixed state).

In the above-described embodiment, the mower 10 which can automatically travel has been described as an example, but the mower 10 need not be limited thereto. For example, the mower 10 may be a hand-push type mower or a riding type mower. When the mower 10 is a hand-push type mower or a riding type mower, the operator can directly instruct the mower 10. For example, suppose that an operator inputs an instruction to move the cutting part 30 to the right or an instruction to move the cover to the left to the mower 10 in order to mow turf grass in the right direction of the mower 10. In this case, the state control part 514 may be configured to control the state of at least one of the cutting part 30 and the cover so that turf grass can be cut in the instructed direction. Specifically, the state control part 514 controls the cutting part 30 to move in the instructed direction or controls the cover to move in a direction opposite to the instructed direction. In such a configuration, the mower 10 may include the detection part 40, or may not include the detection part 40. When the mower 10 of the hand-push type mower or the riding type mower includes the detection part 40, the state control part 514 performs any one of control based on the information obtained from the detection part 40 or control by an instruction from the outside. Further, an angle at which the cutting part 30 is moved and a distance at which the cover is moved may be appropriately set by the operator.

According to such a configuration, it is possible to cut turf grass in a direction desired by an operator which grows in places in which uncut grass remained in the past. As a result, it is possible to reduce the amount of remaining uncut grass as compared with conventional techniques.

The above-described embodiment has described the configuration in which, when the first condition is satisfied, the state control part 514 controls the state of the cutting part 30 so that turf grass in the space provided between the cutting part 30 and the cover can be cut in the cutting part 30. On the other hand, the state control part 514 may be configured to control the state of the cutting part 30 when an instruction to control the state of the cutting part 30 is provided from a server capable of communicating with the mower 10. In this configuration, the server acquires the information (for example, image data) output from the detection part 40 from the mower 10. The server determines whether or not the first condition is satisfied based on the acquired information. When the first condition is satisfied, the server transmits an instruction to control the state of the cutting part 30 to the mower 10.

The instruction to control the state of the cutting part 30 includes information on a direction in which the cutting part 30 is moved and an amount of movement thereof. On the other hand, when the first condition is not satisfied, the server waits. The state control part 514 controls the position of the cutting part 30 according to the instruction obtained from the server.

According to such a configuration, it is not necessary to determine whether or not the first condition is satisfied in the mower 10. Therefore, a process load of the mower 10 can be reduced.

Further, the state control part 514 may be configured to control the state of the cover when an instruction to control the state of the cover is provided from a server capable of communicating with the mower 10. In this configuration, the server acquires the information (for example, image data) output from the detection part 40 from the mower 10. The server determines whether or not the second condition is satisfied based on the acquired information. When the second condition is satisfied, the server transmits an instruction to control the state of the cover to the mower 10. The instruction to control the state of the cover includes information on a direction in which the cover is moved and an amount of movement thereof. On the other hand, when the second condition is not satisfied, the server waits. The state control part 514 controls the position of the cover according to the instruction obtained from the server.

According to such a configuration, it is not necessary to determine whether or not the second condition is satisfied in the mower 10. Therefore, a process load of the mower 10 can be reduced.

An elongated hole through which the rotation shaft 70 passes may be provided in the cover of the mower 10, and the rotation shaft 70 may be configured to be movable inside the elongated hole. In this configuration, the state control part 514 moves the rotation shaft 70 up and down so that a height of the cutting part 30 becomes an instructed height according to an instruction from the outside. When such an elongated hole is provided, it is expected that dust, cut grass, and the like will enter the inside of the elongated hole. Therefore, the cover may include a mechanism for preventing dust, cut grass, and the like from entering the inside of the elongated hole. Examples of such a mechanism include a gear mechanism such as a car gear, a mechanism for blowing air in a direction from the rotation shaft 70 side toward the cutting part 30, and the like.

According to such a configuration, the rotation shaft 70 can move up and down. Therefore, the height of the cutting part 30 can be easily changed. Therefore, it is possible to cut grass at a desired height. In addition, the cover includes the mechanism for preventing dust, cut grass, and the like from entering the inside of the elongated hole. Thus, it is possible to reduce a risk of failure due to the entering of dust, cut grass and the like.

The above-described embodiment has described the configuration in which the mower 10 includes one cutting part 30, but the mower 10 may be configured to include a plurality of cutting parts 30. In such a configuration, the mower 10 is provided so that at least portions of cutting ranges of the plurality of cutting parts 30 overlap each other in the left and right direction and the forward and backward direction, and the heights of the cutting parts 30 are the same. The cutting range of the cutting part 30 is, for example, a range in which grass can be cut with the blade of the cutting part 30 extending. When each of the plurality of cutting parts 30 is rotating, the rotation of each of the cutting parts is controlled by the state control part 514 so that the blades of the plurality of cutting parts 30 do not collide with each other. For example, the state control part 514 controls the blades of the plurality of cutting parts 30 not to collide with each other by shifting a phase when each of the cutting parts 30 is rotated. Further, an actuator is connected to each of the cutting parts 30 so that the positions of the plurality of cutting parts 30 can be controlled independently.

The state control part 514 controls the actuator to control the state of each of the plurality of cutting parts 30 when a predetermined condition is satisfied. For example, the state control part 514 controls the positions of the plurality of cutting parts 30 so that the cutting ranges of the plurality of cutting parts 30 do not overlap when the predetermined condition is satisfied. For example, the state control part 514 may move all the cutting parts 30 in the direction in which the obstacle is present so that the cutting ranges do not overlap, and may move some of the cutting parts 30 in the direction in which the obstacle is present and may move the remaining cutting part 30 in a direction different from the direction in which the obstacle is present so that the cutting ranges do not overlap. The state control part 514 may move the position of the cutting part 30 not only in the left and right direction but also in the forward and backward direction. Further, at least portions of the cutting ranges of the plurality of cutting parts 30 may overlap each other in one of the left and right direction and the forward and backward direction instead of overlapping each other in the left and right direction and the forward and backward direction.

According to such a configuration, even when the mower 10 includes the plurality of cutting parts 30, they can be controlled.

Although the embodiments of the present invention have been described in detail with reference to the drawings, the specific configuration is not limited to these embodiments and includes designs and the like within a range that does not deviate from the gist of the present invention.

What is claimed is:

1. A mower comprising:
   a cutting part configured to cut grass;
   a machine body which includes the cutting part and a cover configured to cover the cutting part from above; and
   a state control part which controls a state of the cutting part such that at least one of grass in a space provided between the cutting part and the cover and grass outside the cover is able to be cut in the cutting part in a case where a first condition is satisfied,
   wherein the cutting part cuts the grass at a fixed position by a fixing member in a case where the first condition is not satisfied,
   the state control part controls the cutting part in a movable state by moving the fixing member and moves a position of the cutting part to a vicinity of a position of the cover in a case where the first condition is satisfied, and
   the state control part controls a state of the cover such that at least one of the grass in the space provided between the cutting part and the cover and the grass outside the cover is able to be cut in the cutting part in a case where a second condition is satisfied.

2. The mower according to claim 1, further comprising a detection part which acquires information for detecting an obstacle,
   wherein when the obstacle is detected based on the information acquired by the detection part, the state control part controls the state of at least one of the cutting part and the cover such that grass is able to be cut in a direction in which the detected obstacle is present.

3. The mower according to claim 2,
   wherein the state control part controls the cutting part to move in the direction in which the obstacle is present or controls the cover to move in a direction opposite to the direction in which the obstacle is present.

4. The mower according to claim 1,
   wherein the state control part controls a state of at least one of the cutting part and the cover such that the grass is able to be cut in an instructed direction when a control instruction is provided from an outside.

5. The mower according to claim 4,
   wherein the state control part controls the cutting part to move in the instructed direction or controls the cover to move in a direction opposite to the instructed direction.

6. The mower according to claim 2,
   wherein the detection part is an image sensor which captures an image of a surrounding environment, and the state control part detects the obstacle based on the image obtained by the image sensor.

7. The mower according to claim 2,
   wherein the detection part is a contact sensor which is able to detect the obstacle by coming into contact with the obstacle, and
   the state control part detects the obstacle based on a pressure applied to the contact sensor.

8. The mower according to claim 2,
   wherein the detection part is a position information acquisition part which acquires position information, and
   the state control part detects the obstacle based on the acquired position information and map data which indicates a position of an obstacle in a traveling place.

9. The mower according to claim 1,
   wherein the state control part outputs a sound or stops control when a living being is detected in a case where the state of at least one of the cutting part and the cover is controlled such that grass outside the cover is able to be cut.

10. The mower according to claim 1,
    wherein an elongated hole through which a shaft part connected to the cutting part passes is provided on the cover, and the state control part controls a height of the cutting part by moving the shaft part in response to an instruction.

11. The mower according to claim 10,
wherein the cover includes a mechanism which prevents grass from entering an inside of the elongated hole.

12. The mower according to claim 1, comprising
a plurality of cutting parts,
wherein the state control part independently controls a state of each of the plurality of cutting parts when the first condition is satisfied.

* * * * *